(12) United States Patent
Li

(10) Patent No.: US 6,609,050 B2
(45) Date of Patent: *Aug. 19, 2003

(54) VEHICLE WARRANTY AND REPAIR COMPUTER-NETWORKED SYSTEM

(75) Inventor: David D Li, Metamora, MI (US)

(73) Assignee: DaimlerChrysler Corporation, Auburn Hills, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 12 days.

(21) Appl. No.: 09/488,024

(22) Filed: Jan. 20, 2000

(65) Prior Publication Data

US 2002/0072808 A1 Jun. 13, 2002

(51) Int. Cl.⁷ ............................................... G06F 17/60
(52) U.S. Cl. ............................. 701/29; 701/33; 701/35; 705/11
(58) Field of Search ............................. 705/21, 23, 4, 705/7, 11; 701/29, 30, 32, 33, 35

(56) References Cited

U.S. PATENT DOCUMENTS

| | | | | |
|---|---|---|---|---|
| 4,404,639 A | * | 9/1983 | McGuire et al. | 701/35 |
| 4,989,146 A | * | 1/1991 | Imajo | 701/35 |
| 5,432,904 A | * | 7/1995 | Wong | 705/4 |
| 5,594,791 A | | 1/1997 | Szlam et al. | |
| 5,657,233 A | * | 8/1997 | Cherrington | 705/16 |
| 5,764,923 A | | 6/1998 | Tallman et al. | |
| 5,778,381 A | | 7/1998 | Sandifer | |
| 5,884,202 A | * | 3/1999 | Arjomand | 701/35 |
| 6,009,355 A | * | 12/1999 | Obradovich et al. | 701/29 |
| 6,104,988 A | * | 8/2000 | Klarer | 701/33 |

FOREIGN PATENT DOCUMENTS

JP        2000309253 A    * 11/2000

OTHER PUBLICATIONS

*Beverage World* "New lease on truck life: Automated Maintenance" article (pp. 138), May 1994.*
*Newswire* "High–tech Auto Service Now Easier to Find" article, May 1988.*
*Motor Age* "ALLDATA tech infobase means to–date auto repair technology" article (p. 19), Nov. 1991.*
*Tire Business* "Diagnostic system gives Ford dealers a leg up" article (p. 13), Sep. 1990.*

* cited by examiner

*Primary Examiner*—Dean J. Kramer
(74) *Attorney, Agent, or Firm*—Mark P. Calcaterra

(57) ABSTRACT

A computer-based warranty administration system provides vehicle-specific service. The system includes a dialog manager for collecting service information regarding a vehicle from a user. The system also has an artificial intelligence based reasoning module for analyzing the service information to determine a diagnosis. The system further includes a repair processing module for administering warranty-specific service based on the diagnosis and the service information.

22 Claims, 25 Drawing Sheets

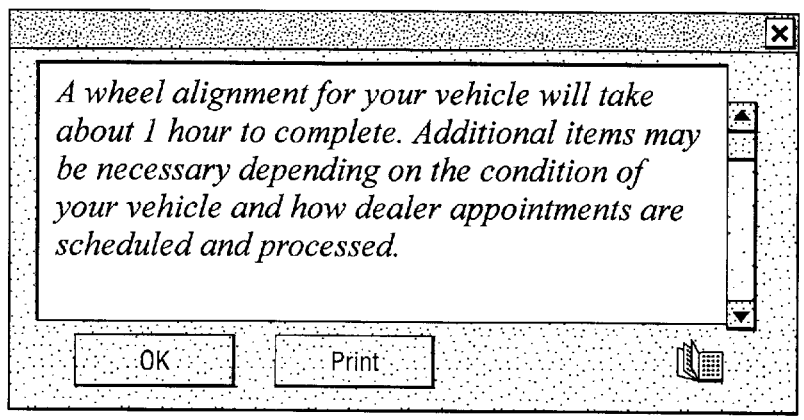
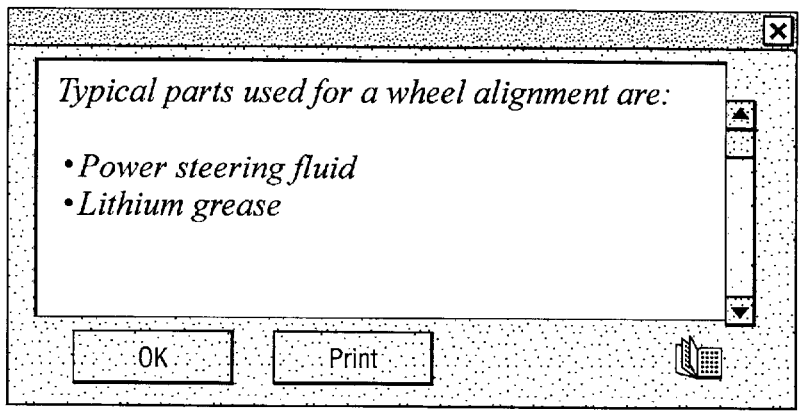
Fig. 10
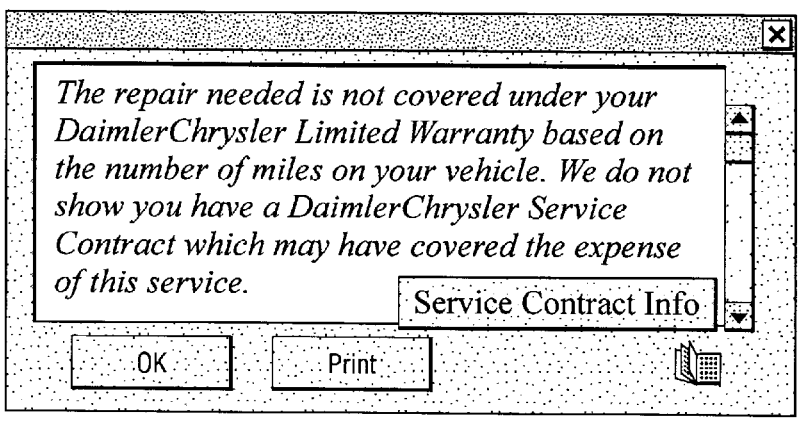
Fig. 11

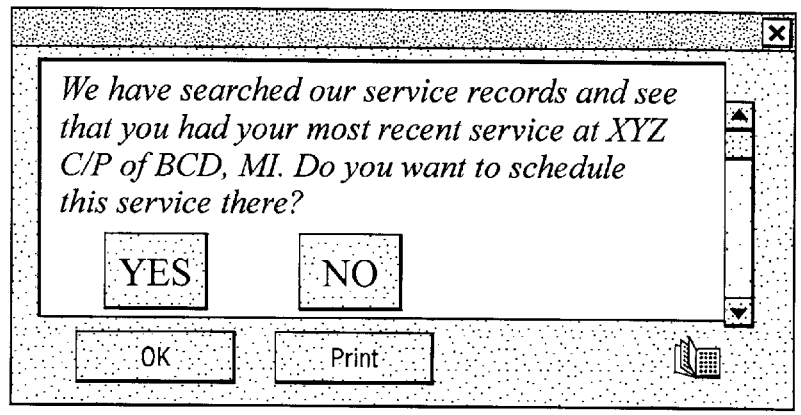
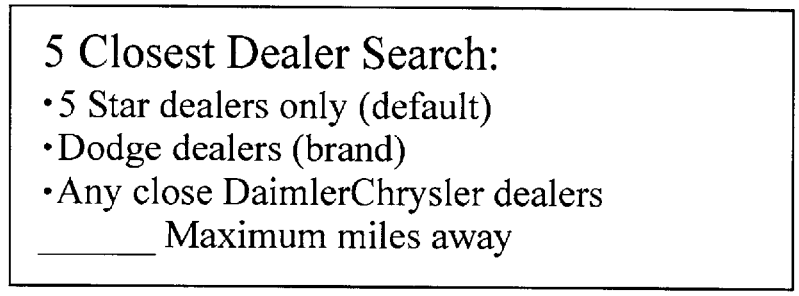
Fig. 12
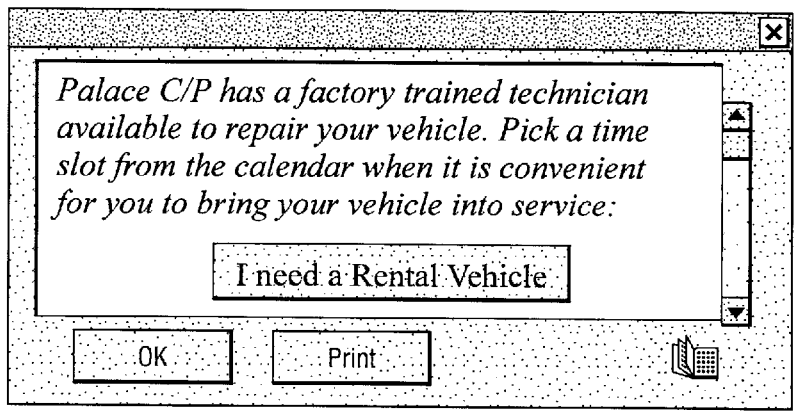
Fig. 13

Work Order

| Analyze | Vehicle info | Coverage | Service Hist... | QC | | 1999 DODGE DAKOTA P/U CL<br>4.0 MPI I-6<br>HUNTER GREEN |

Vehicle Info
- VIN: 1B7GL22Y9XS214777
- Odometer: 2919
- Key Tag: 3345
- Work Order #: 2223
- Location: Lot A

[VIP] [Damage] [Save]

Customer Info
- Name: Smith, John T.
- Address 1: P.O. Box 237
- Address 2:
- City: Anytown
- State: AZ      Zip: 12345-6789
- Phone 1: (800) 555-1111
- E-Mail: jst@hotmail.com

[Update] [Modify] [Print]

Work Order:

| Item | | Description | Part # | Cost | Hours | Customer Pay |
|---|---|---|---|---|---|---|
| 001 | C | (D) Change Engine Oil | | 9.60 | 0.2 | 8.00 |
| | C | Oil Filter | 101Mopar | 7.00 | 0.0 | 7.00 |
| | C | Oil 10W30 | NPN | 5.00 | 0.0 | 5.00 |
| 002 | C | Customer states vehicle shakes at high speed | | 48.00 | 1.0 | 48.00 |

Tax: $4.08      Total: $72.08

Tasks:

| Description | Time Due | Completed | Time Completed | Authorized By |
|---|---|---|---|---|
| call Mr. Smith with revised estimate | 2:00 | | | mr. smith |

[Note] [Add] [Delete]

[OK] [Cancel]

Fig. 17

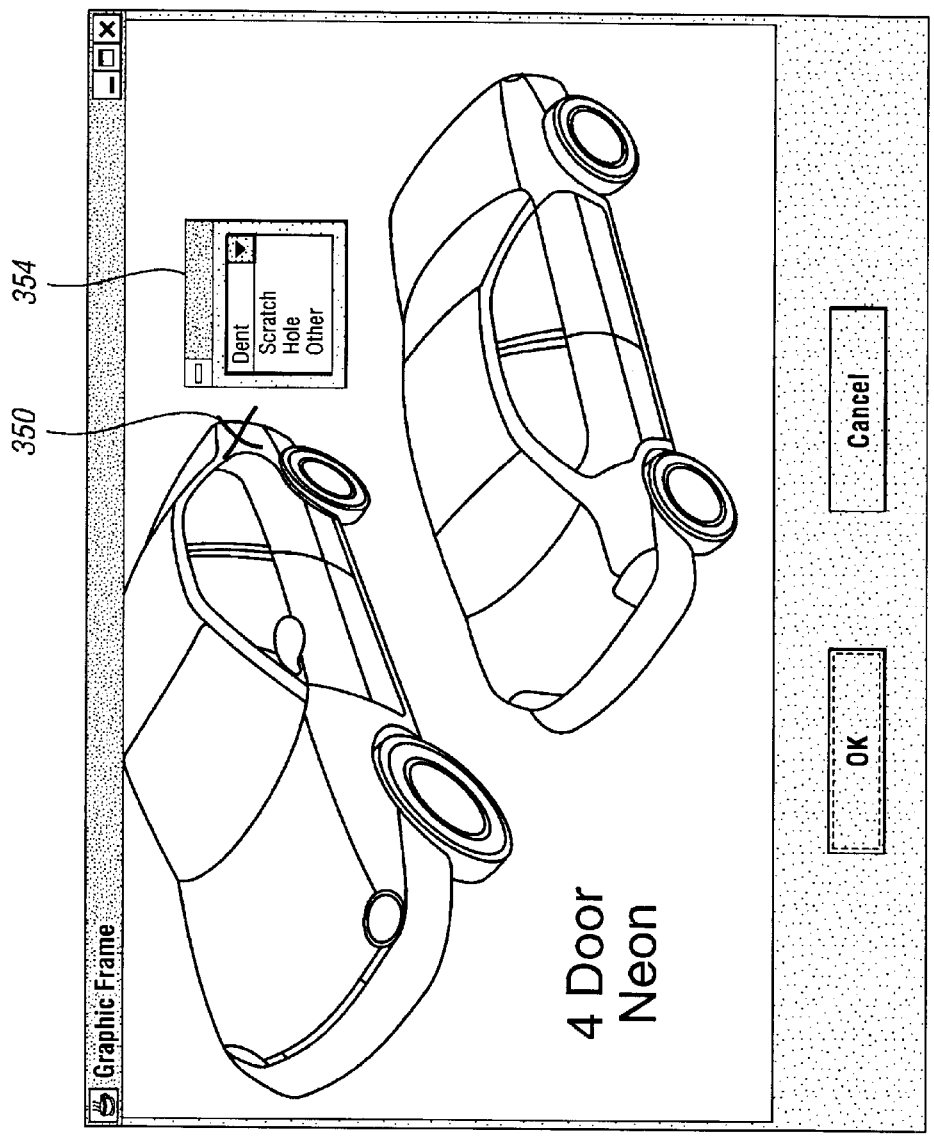

Vehicle Information

Owner
- Name: Smith, John T.
- Co-Owner:
- Address 1: P.O. Box 237
- Address 2:
- City: Anytown
- State: AZ    Zip: 12345-6789
- Phone 1: (800) 555-1111
- Phone 2:
- E-Mail: jst@hotmail.com

Vehicle
- Built Date: 08/25/1998
- Curr. Odometer: 2919
- In-Service Date: 10/01/1998
- Body Style: AN1L31
- Transmission:
- Seller: 62000-Anytown Motors
- Zone: 69

Option
- Color 1: Red
- Color 2: Black
- Primary Paint: Red
- Secondary Paint: Black

Equipment

| Code | Description |
|------|-------------|
| EGB  | -3.3L V6 (SFI) N-S VGAS |

DTC
None

Warranty Coverage

| Type | Type | Deductible | Expires | Remaining |
|---|---|---|---|---|
| BASIC | 36 MOS or 36000 Miles | 0 | 10/01/2002 | 35MOS or 35000 Miles |
| POWERTRAIN | 36 MOS or 36000 Miles | 0 | 10/01/2002 | 35MOS or 35000 Miles |
| PERFORATION | 84 MOS or 100000 Miles | 0 | 10/01/2005 | 83MOS or 97000 Miles |
| EMISSION | 36 MOS or 36000 Miles | 0 | 10/01/2002 | 35MOS or 35000 Miles |
| ADJUSTMENT | 36 MOS or 36000 Miles | 0 | 10/01/2002 | 35MOS or 35000 Miles |
| AIR COND. | 36 MOS or 36000 Miles | 0 | 10/01/2002 | 35MOS or 35000 Miles |
| EX. FED. EMIS | 96 MOS or 80000 Miles | 0 | 10/01/2007 | 95MOS or 76000 Miles |

Service Contract Info

Contract No.:
Name:
Plan Code:
Description:
Sales Date:
Deductible:

☐ Reduced Warranty Deductible
☐ Hi Tech Coverage

Service Contract Detail

Effective Date:
Expiration Date:
Daily Rental Allowed:
Max Rental Days:
Cancellation Fee:
Transfer Fee:

☐ Roadside Assistance (If Yes; prior approval required)
☐ Road Hazard

Service History:

| Date | Dealer/Payee | Claim | Repair Type | LOP | LOP Desciption |
|------|--------------|-------|-------------|-----|----------------|
|      |              |       |             |     |                |

Recalls:

| Recall | Dealer/Payee | Launch Date | Completed | Completed Date |
|--------|--------------|-------------|-----------|----------------|
|        |              |             |           |                |

Service Request

VIN: 1B7GL22Y9XS214777  Year: 1999  Model: DODGE DAKOTA P/U CL  Customer: Smith, John T.

Recommendations:

| Type | Description | Acceptance |
|---|---|---|
| Recommend | 3000 Mile Service | Decline |
| Special | Oil Change for $14.95 only | Decline |

Service Menu

- ☐ 3000 Mile Service
- ☑ Change Engine Oil
- ☐ Tune Up
- ☐ Alignment
- ☐ Tire Rotation
- ☐ Exhaust/Emission
- ☐ Radiator Service
- ☐ Transmission Service
- ☐ Front Brakes
- ☐ Rear Brakes
- ☐ AC Service
- ☐ Safety Inspection
- ☐ Inspect Suspension
- ☐ Inspect Hoses/Belts
- ☐ Inspect Battery/Charging Sys
- ☐ Inspect Wipers/Fluids ☐ Re-Visit   [Analyze] [Add] [Clear]

Other Work Needed:
Customer states vehicle shakes at high speed

Payment Method: C-Customer Pay

Work Order:

| Item | | Description | Part # | Cost | Hours | Customer Pay |
|---|---|---|---|---|---|---|
| 001 | C | (D) Change Engine Oil | | 9.60 | 0.2 | 8.00 |
| | C | Oil Filter | 101Mopar | 7.00 | 0.0 | 7.00 |
| | C | Oil 10W30 | NPN | 5.00 | 0.0 | 5.00 |
| 002 | C | Customer states vehicle shakes at high speed | | 48.00 | 0.0 | 48.00 |

[Delete]  Tax: $4.08

[OK] [Cancel]  Total: $72.08

*Fig. 23*

Analyzer

VIN: 1B7GL22Y9XS214777  Year: 1999  Model: DODGE DAKOTA P/U CL  Customer: Smith, John T.

Customer Statement:
Customer states vehicle shakes at high speed

[ Analyze ]  [ Clear ]

Questions:

| | |
|---|---|
| Does the symptom occur all the time? | No |
| Did customer drive over a pothole or a curb? | No |
| Is the vibration felt in the steering wheel? | Yes |
| Is the vibration felt in the seat? | Unanswered |
| Does the vibration cause a visible "Shake"? | Unanswered |
| Does the vibration feel like a wobble? (side to side) | Unanswered |
| At what speed does the customer feel vibration? | >=60MPH |
| Does the vibration occur while braking? | Unanswered |

Hints:

| Description | EST Labor Hours | Estimate ($) | Acceptance |
|---|---|---|---|
| Worn brake rotor | 0.5 | 24.00 | Accept |
| Inspect propeller shaft | 1.5 | 72.00 | Accept |
| TSB - High-Speed Driveline Vibration | 2.0 | 98.00 | Accept |

[ OK ]  [ Cancel ]

400 — Questions
404 — Hints

| VIN | Year | Model | Engine |
|---|---|---|---|
| Please enter a VIN | | | |

Enter LOP / LOP Desd / Part Num / Part Desc paint | Search | Advanced | Clear

Labor Operation Codes
- 23 Body/Paint-Color Coat
  - 6049 SPOILER, DECKLID/LIFTGATE-Color coat(A)
    - 01 Complete
  - 6051 FENDER-Color coat(A)
    - 02 Complete-right or left monotone
    - 0e Complete-right or left monotone

| FC | Description |
|---|---|
| UC | UNCODEABLE |
| CJ | OFF COLOR |
| X7 | THIN NO PAINT |
| 41 | FOREIGN MATERIAL |
| 69 | DISCOLORED |
| 75 | OVER SPRAY |
| 76 | ORANGE PEEL |
| 88 | SAGS OR RUNS |

Image

☐ Sort by Title

LOP Details - Body/paint-Color Coat: SPOILER, DECK LID/LIFTGATE-Color coat(A)

| Type | LOP | Description | Labor Hours |
|---|---|---|---|
| Primary | 23-6049-01 | Complete | 1.2 |
| Related Procedure | 23-0206-50 | Spoiler-Remove and Install | 0.4 |

Total Hours  1.6

OK | Cancel

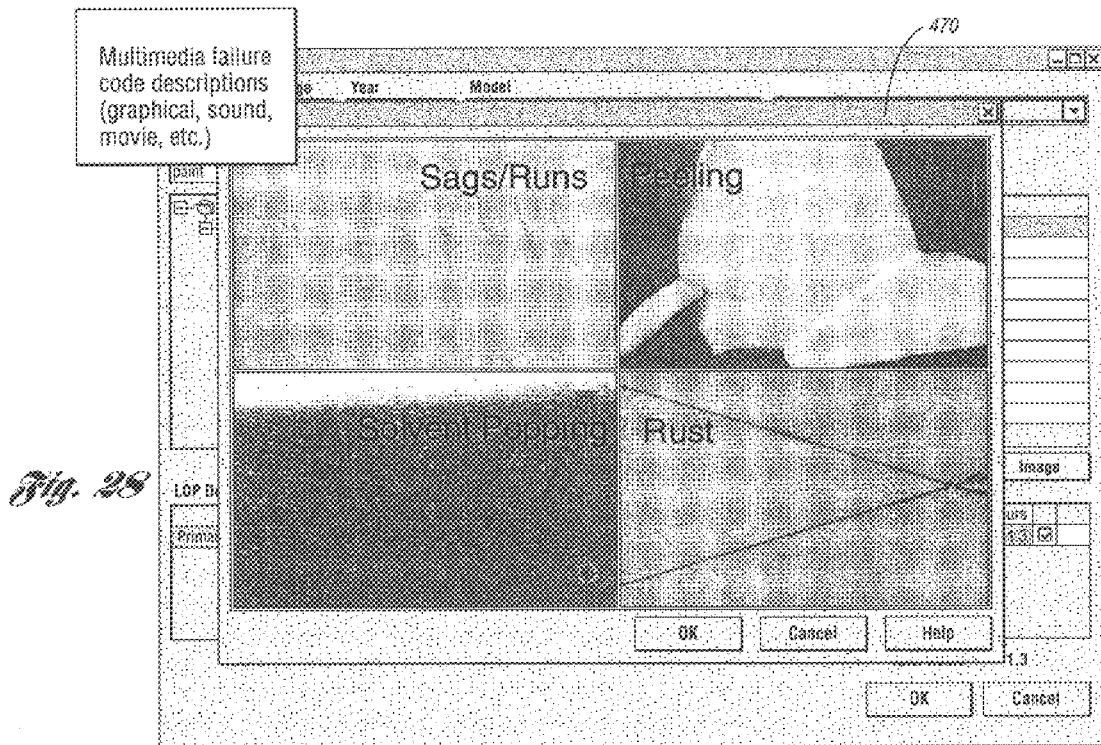

VEHICLE WARRANTY AND REPAIR COMPUTER-NETWORKED SYSTEM

BACKGROUND OF THE INVENTION

1. Field of the Invention

The present invention relates generally to a computer-based vehicle warranty and repair administration systems. More particularly, the present invention relates to a computer-networked warranty and repair administration system.

2. Discussion of the Related Art

In the field of automotive servicing, consumers purchase either new or used vehicles that may or may not have a warranty. Typically, a new automobile will come with a minimum thirty-six month warranty that covers the repair of most manufacturing-related problems. While in the past, most used cars have not been accompanied by any more than a ninety day limited warranty, a recent trend has been toward increasing coverage for certain "certified" used cars. This trend has increased the importance of efficient, reliable vehicle service to providers of both warranty servicing and non-warranty servicing.

While automotive sales are obviously important to automobile dealerships, servicing also represents a substantial portion of their business. As such, vehicle dealerships have servicing departments which handle high volumes and therefore enjoy a heavy workload.

During a typical servicing write-up, a customer will arrive at the dealership either with or without an appointment and request "on the spot" attention. The service advisor will make a brief determination of the necessary parts and labor needed to complete the repair. It is important to note that this vehicle write-up must be completed quickly in order for the servicing department to effectively handle a high volume of repairs. Thus, there is little time to perform an effective preliminary diagnosis, and underlying problems often appear after the repair process has begun and an estimate has been given. Another difficulty is presented by the fact that few resources exist that can aid in vehicle-specific diagnosis when determining servicing requirements. High employee turnover also typically exists at the service advisor position, which creates additional resource and scheduling difficulties.

The service advisor performs a repair estimate, creates an initial repair order, dispatches the work to a service technician, and monitors the progress of repair. The service associate also communicates the progress of repair back to the customer and serves as a point of contact. Upon completion of the servicing, the associate explains the services performed and supervises the return of the vehicle to the owner.

A shortcoming of this approach relates to the write-up process and the need for effective pre-diagnosis. Specifically, the collection of service information such as symptoms, customer identification and vehicle identification is performed manually and under substantial time constraints. Furthermore, the analysis of the service information is typically cursory.

SUMMARY OF THE INVENTION

The present invention overcomes the aforementioned disadvantages as well as other disadvantages. In accordance with the teachings of the present invention, a computer-based warranty administration system with a dialog manager is provided for collecting service information regarding a vehicle from a user. The system also preferably has a case based reasoning module for analyzing the service information to determine a diagnosis. The system further includes a repair processing module for administering warranty-specific service based on the diagnosis and the service information.

Further objects, features and advantages of the invention will become apparent from a consideration of the following description and the appended claims when taken in connection with the accompanying drawings.

BRIEF DESCRIPTION OF THE DRAWINGS

FIGS. 7–9 are case based reasoning module screen prompts when the system is in pre-diagnosis mode;

FIG. 10 is a repair processing module screen prompt for estimating labor and parts;

FIG. 11 is a repair processing module screen prompt for presenting the repair estimate to the customer;

FIG. 12 is a repair processing module screen prompt for determining a servicing dealer;

FIG. 13 is a repair processing module screen prompt for scheduling the service;

FIG. 17 is an user interface for accessing the main information regarding the reasons a vehicle is entering the shop;

FIG. 18 is a computer-human interface for depicting where damage may have occurred on a vehicle, and for identifying additional service work needed with estimation capability;

FIG. 19 is a computer-human interface for obtaining and modifying vehicle information including updating corporate and customer contact databases;

FIG. 21 is a computer-human interface for obtaining and modifying warranty coverage data;

FIG. 22 is a computer-human interface for obtaining service history;

FIG. 23 is a computer-human interface for obtaining and modifying service request data;

FIG. 24 is a computer-human interface for using the service analyzer feature of the present invention;

FIG. 25 is a computer-human interface that depicts a message being displayed to an user;

FIGS. 26 and 27 are computer-human interfaces for performing lookups for labor operation codes; and FIG. 28 is a computer-human interface for displaying multi-media depictions of vehicle problems.

DETAILED DESCRIPTION OF THE PREFERRED EMBODIMENT

Figure 1:
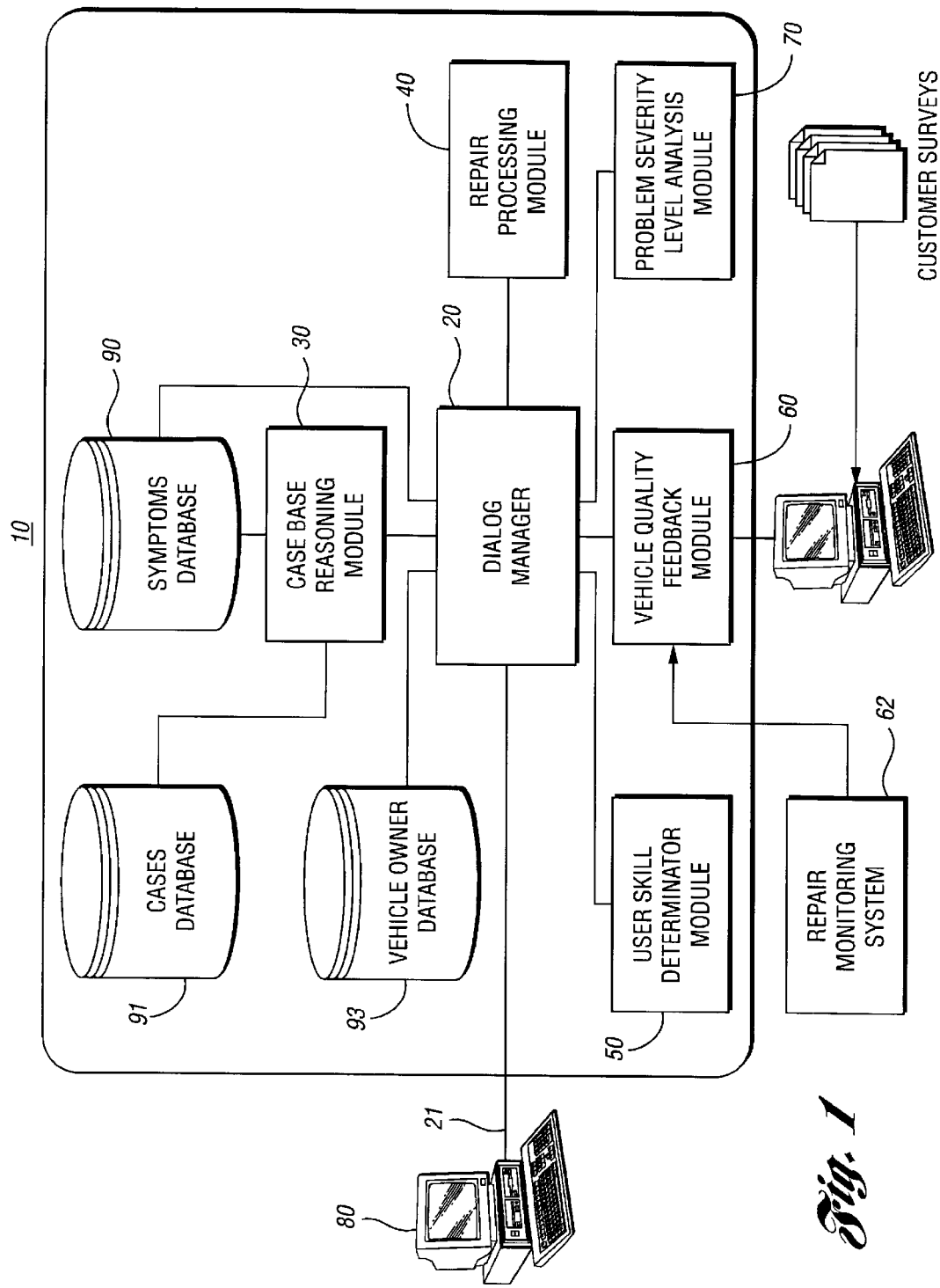
FIG. 1 is a software block diagram of a computer-based service administration system in accordance with the present invention.

As shown in FIG. 1 at 10, the present invention is directed toward a computer-based warranty and repair computer-networked system. The system 10 includes a dialog manager 20, a case based reasoning module 30, and a repair processing module 40. The preferred embodiment further includes a user skill determinator module 50, a vehicle quality feedback module 60, and a problem severity level analysis module 70.

Repair monitoring system 62 monitors the evaluation of the repair process. Each step of the repair process is scored relative to how well a step was performed. A high score is provided to a step that was performed well. A low score is provided to a step that was performed poorly. The people involved in each step is also recorded.

For example, a technician may be receiving on average high scores over a year period for the step of repairing transmissions, but receiving on average low scores over the same period for the step of repairing brakes. Thus, the system of the present invention will assign that technician to handle transmission assignments and not brake assignments. The system then may recommend that the technician be sent to a training program to learn additional brake repair skills.

It should also be understood that each step is evaluated in this aforementioned manner —that is, from the first step where the vehicle is brought into the shop and where the vehicle is assessed for warranty coverage to the final step of where the vehicle is driven away by the customer from the shop. The repair monitoring system 62 provides reports on which steps in the process need improvement (e.g., which steps by which people are bottlenecks).

The system 10 provides for the administration of warranty and repair specific services and is preferably implemented in an Internet-based environment. Dialog manager 20 collects service information regarding a vehicle from a user. This collection process can take place via a computer interface 80 which can be located either at the location of service or in the user's home by way of Internet networking 21 or other networking technologies (e.g., local area networks, wide area networks, global networks connected by common protocols). The case based reasoning module 30 analyzes the service information to determine a pre-diagnosis. It should be understood that the present invention is not limited to using case based reasoning but includes using other artificial intelligence techniques as inference engines in order to determine a pre-diagnosis. For example, the present invention in an alternate embodiment utilizes a neural network in order to perform pre-diagnosis. The neural network can be trained based upon actual situations in order to properly determine the weights between layers of the neural network. Other inference engines include utilizing fuzzy logic.

The pre-diagnosis can be as general as indicating that routine maintenance is required and as specific as indicating that a detailed servicing procedure should be followed. The repair processing module 40 allows the administration of warranty-specific service based on the pre-diagnosis and the service information.

Figure 2:
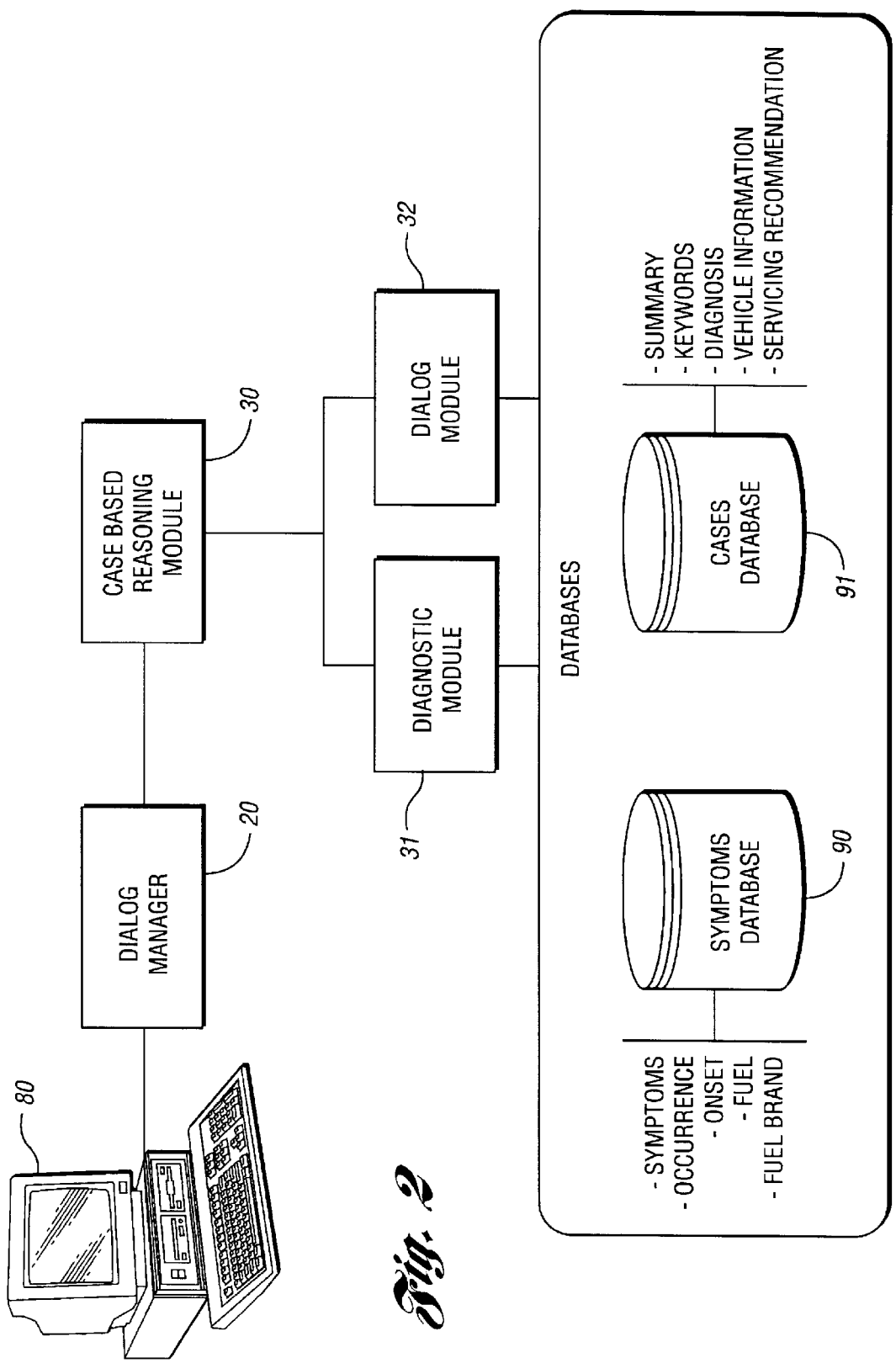
FIG. 2 is a software block diagram of a case based reasoning module in accordance with the present invention.

Turning now to FIG. 2, operation of the case based reasoning module 30 is shown in greater detail. Specifically, the case based reasoning module 30 includes a diagnostic module 31 for analyzing the service information with a symptoms database 90 and a cases database 91. The symptoms database 90 contains information regarding automotive symptoms such as "brakes make a grinding noise" or "idle speed is too high." The cases database 91 contains information regarding automobiles exhibiting automotive symptoms contained in the symptoms database 90. For example, the cases database 91 might contain the record that a certain type of vehicle may pull to the right even when the brakes are not applied and that this has been diagnosed as an imbalance in the front end.

Data fields for the cases database 91 include summary, keywords, diagnosis, vehicle information, and servicing recommendation. The case based reasoning module 30 also includes a dialog module 32 for generating case-specific queries based on the symptoms database 90, and the cases database 91.

Dialog module 32 is capable of operating in a pre-diagnosis mode in which a service associate can enter free text of what service is requested. The dialog module 32 can also operate in a customer mode wherein the case based reasoning module 30 makes its determination via a simplified question and answer session.

Figure 3:
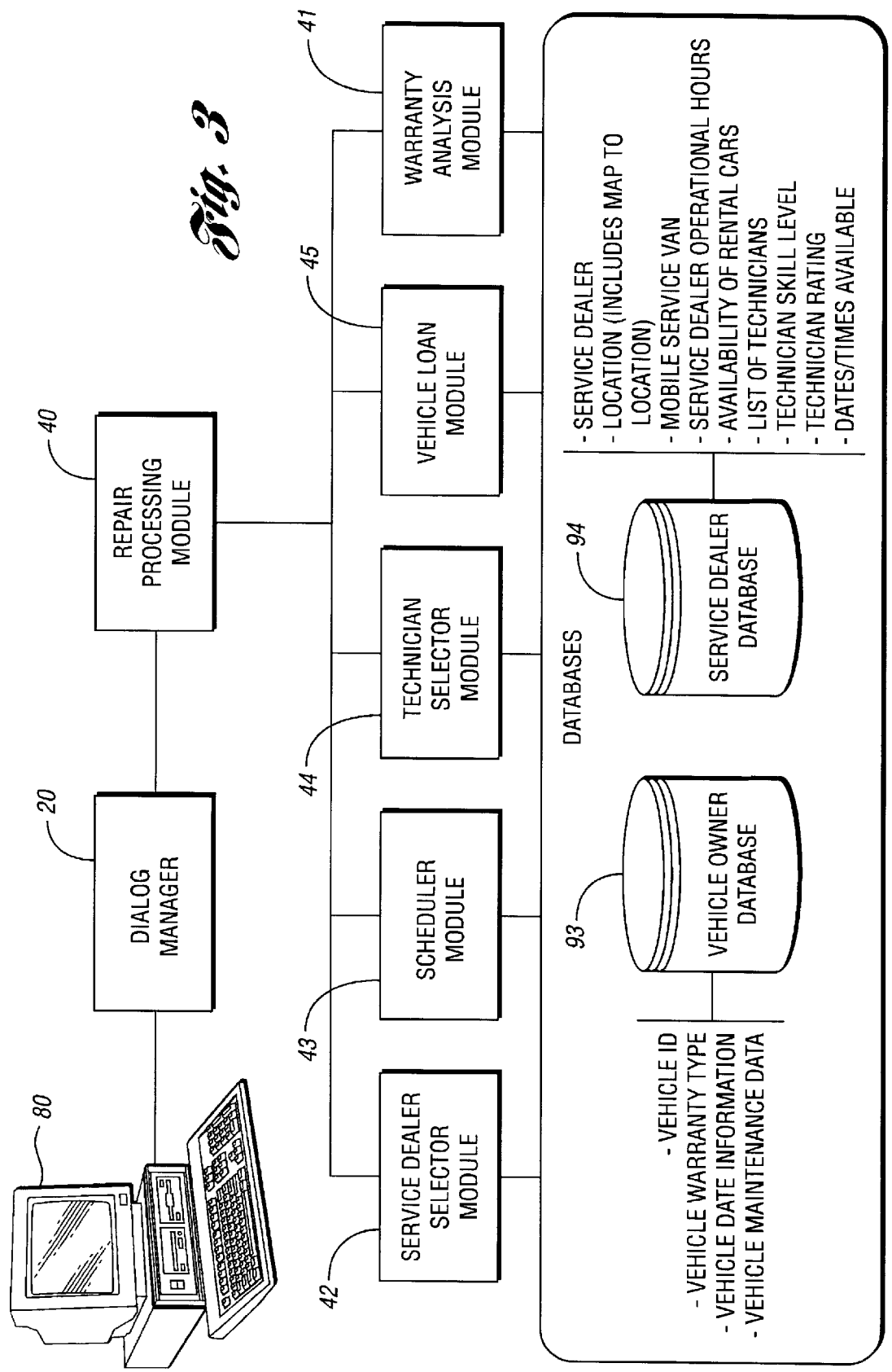
FIG. 3 is a software block diagram of a repair processing module in accordance with the present invention.

Turning now to FIG. 3, the repair processing module 40 is shown in greater detail. The repair processing module 40 includes a warranty analysis module 41 for determining a warranty status based on a vehicle owner database 93. The vehicle owner database 93 contains information regarding vehicle warranties. For example, the vehicle owner database 93 can include data fields such as vehicle ID, warranty type, date information, and maintenance data.

The repair processing module 40 further includes a service dealer selector module 42 for determining a service dealer location based on the warranty status, the service information, and a service dealer database 94. The service dealer database 94 contains information regarding service dealers such as location (including maps), availability of rental cars, and technician lists. This information enables the repair processing module 40 to suggest service dealers which are nearest to the customer.

A scheduler module 43 is also included and enables the repair processing module 40 to schedule the vehicle for service at a specific date and time based on the selected service dealer location and the service dealer database 94. A technician selector module 44 selects a technician at the service dealer location to service the vehicle based on the date and time, and the service dealer database. The technician selector module 44 also determines which technicians at the desired location are qualified to perform the recommended service based upon a predetermined technician rating system. Finally, the repair processing module 40 has a vehicle loan module 45 for determining vehicle loan availability at the desired date and time.

Figure 4:
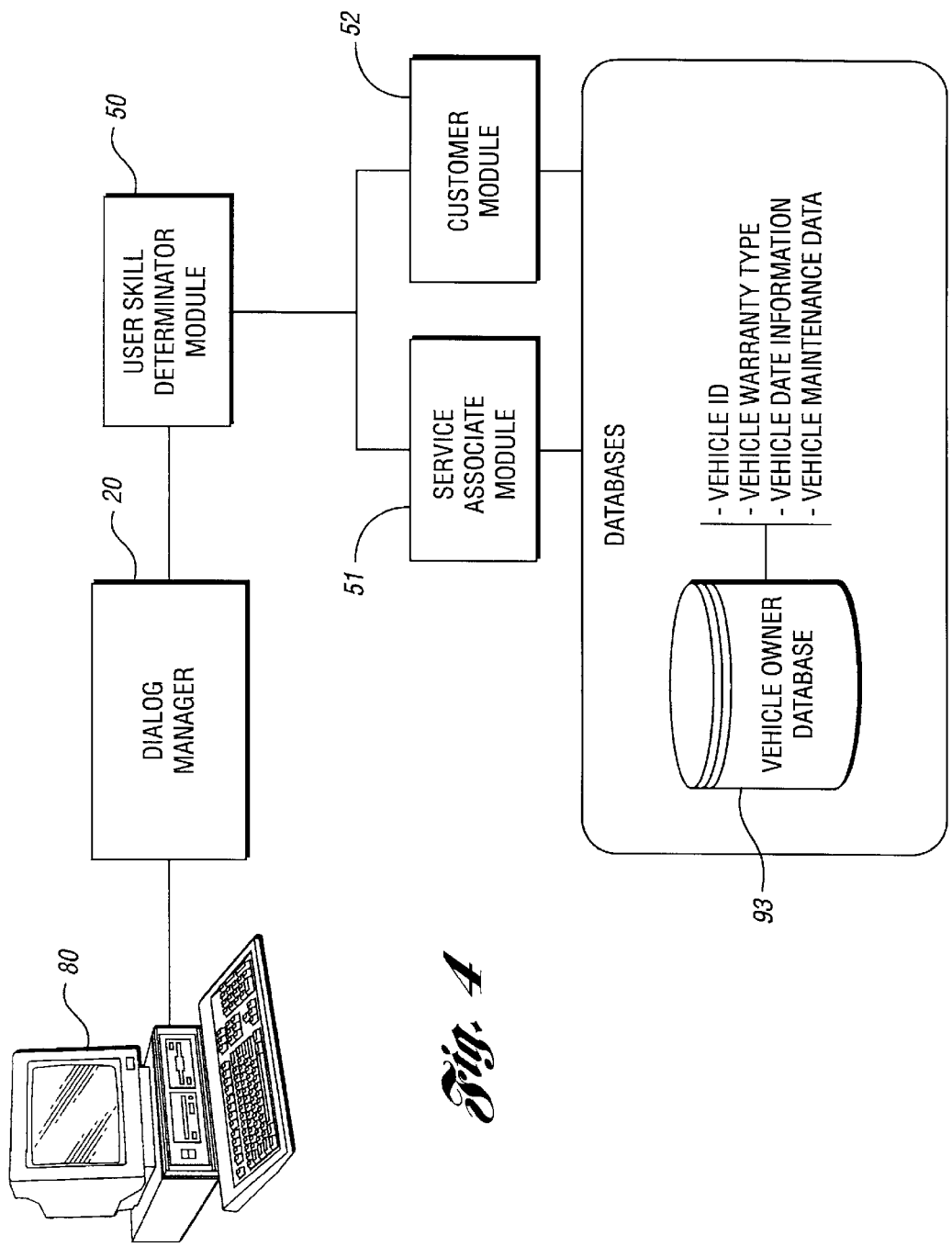
FIG. 4 is a software block diagram of a user skill determinator module in accordance with the present invention.

Turning now, to FIG. 4, the system 10 may also include a user skill determinator module 50 for determining a skill level for the user. Specifically, the user skill determinator module 50 includes a service associate module 51 and a customer module 52. The service associate module 51 adjusts the system 10 toward service associates based on the vehicle owner database 93. The customer module 52 adjusts the system toward customers based on the vehicle owner database 93 and provides different interactive screens. Such adjustments are determined by service information entered by the user. The user skill determinator module 50 can therefore operate in conjunction with the case based reasoning module 30 when determining whether to operate in the pre-diagnosis mode or the customer mode. In the preferred embodiment, a user's skill is stored in the database so that the next time that the user accesses the system, the present invention has a starting point for determining a user's skill level. It should be noted that the present invention is able to adjust dynamically the ranking of a user's skill level, based upon, such items as, but not limited to, how well an user answers questions presented by the present invention.

Figure 5:
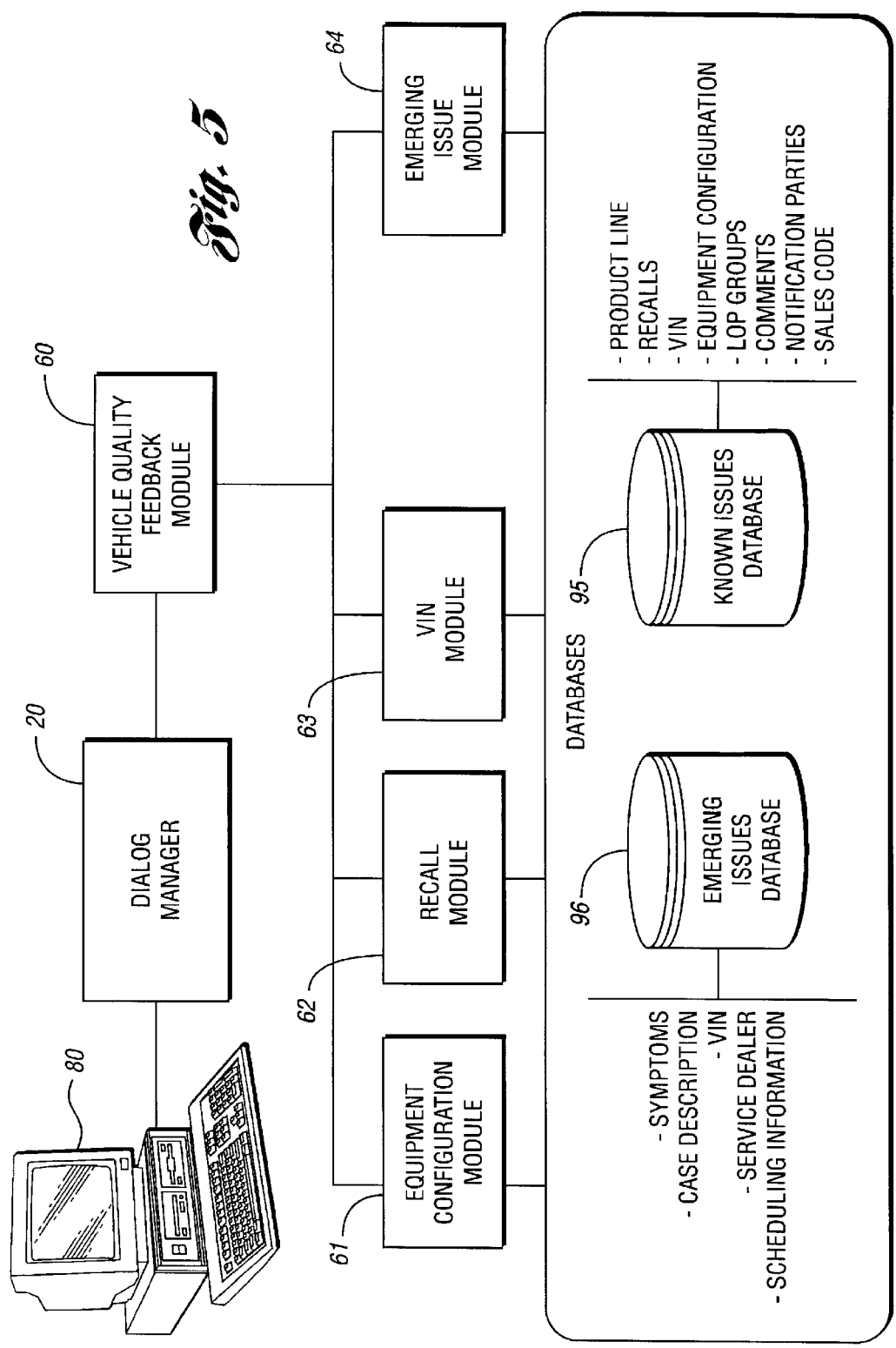
FIG. 5 is a software block diagram of a quality feedback module in accordance with the present invention.

As shown in FIG. 5, the preferred embodiment also includes a vehicle quality (i.e., performance) feedback module 60 for monitoring servicing issues based on the diagnosis and the service information. The vehicle quality feedback module 60 includes an equipment configuration module 61 for determining whether the vehicle contains an equipment configuration which has been identified as having particular and/or unique servicing issues. This determination is based upon a known issues database 95 wherein the known issues database 95 contains information regarding particular servicing issues. This database can be maintained by engineering, manufacturing, or customer service personnel or any combination thereof. Preferred data fields for the known issues database 95 include recalls, product line, equipment configuration, and VIN (vehicle identification number).

The vehicle quality feedback module 60 also includes a recall module 62 for determining whether the vehicle is under recall based on the known issues database 95. The user is notified whether the vehicle is under recall by recall module 62. Another aspect of the feedback module 60 is a VIN module 63 for determining whether the VIN for the vehicle has been identified as having servicing issues. For example, the same vehicle of a particular customer may have been in the repair shop repeatedly for the same problem. The present invention detects this repetitive condition and uses case based reasoning with the knowledge that this is a repetitive condition to determine a possible repair. This determination also makes use of the known issues database 95. The known issues database 95 details whether a particular brand of car has certain common problems. This can prompt the user that more resources may be needed to make sure the repair is effectively performed. Quality control system can also be triggered to monitor the next repair activity to raise awareness of a difficult repair issue.

An emerging issues module 64 updates an emerging issues database 96 based on the diagnosis when an issue arises that is not found in the known issues database 95. This aspect allows the system 10 to effectively update itself as new technologies and problems arise. For example, if a number of cars in the southern states of the United States experience similar problems, then the present invention updates the emerging issues database with data that indicates that a particular brand of car may be experiencing problems due to a southern climate (e.g., higher humidity and temperature) and not due to other unrelated possibilities.

Figure 6:
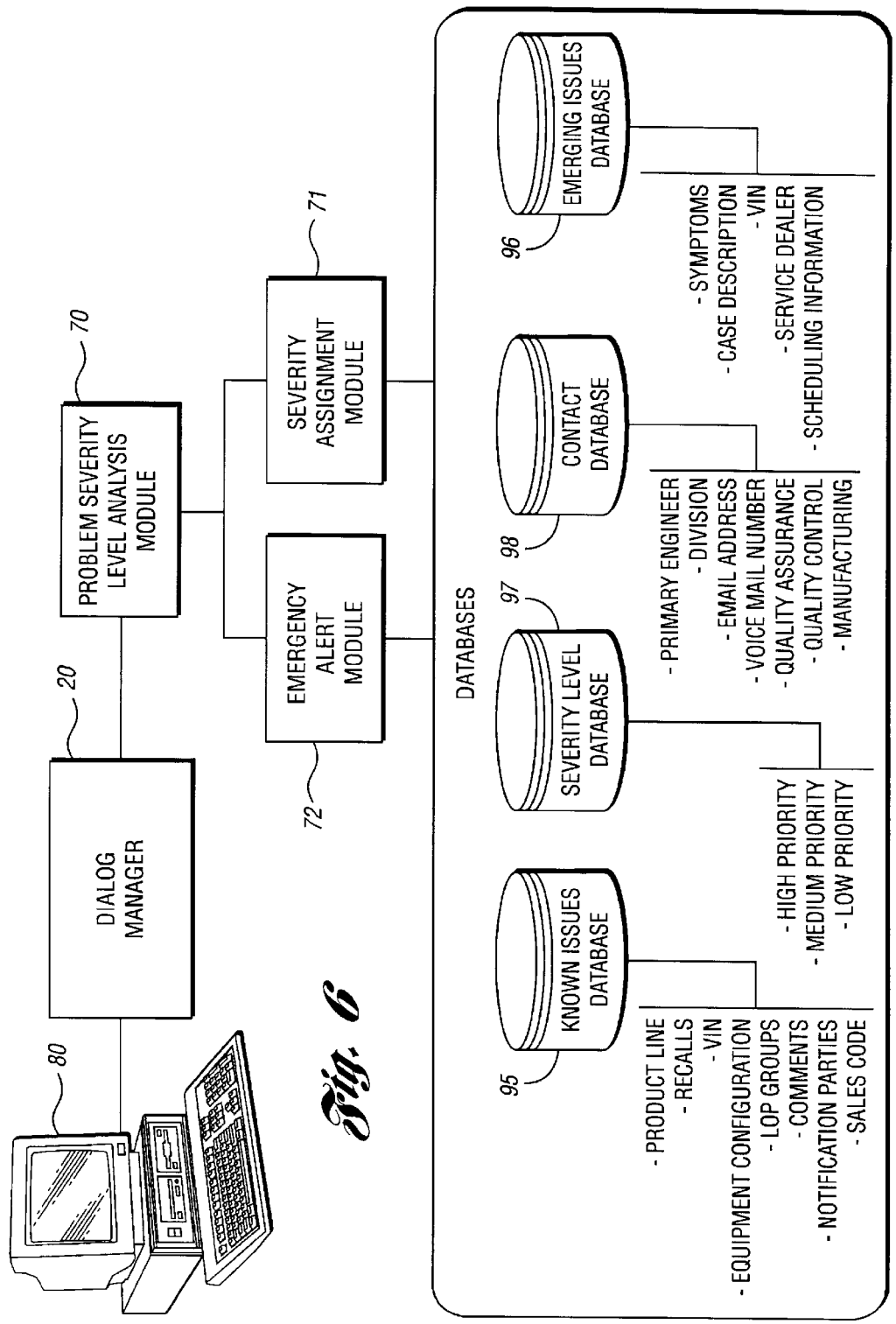
FIG. 6 is a software block diagram of a problem severity level analysis module in accordance with the present invention.

As depicted in FIG. 6, the system 10 also provides a problem severity level analysis module 70 capable of notifying concerned parties when servicing issues reach a predetermined priority or severity level. The module 70 includes a severity assignment module 71 and an emergency alert module 72. The severity assignment module 71 assigns priority levels to issues contained in the known issues database 95 and the emerging issues database 96. This assignment is based on a severity level database 97 which contains information regarding problem severity. The severity level database 97 includes data fields such as high priority, medium priority, and low priority and effectively provides the severity assignment module 71 with instructions for assigning a severity level to a particular issue.

An emergency alert module 72 notifies concerned parties when servicing issues have a priority above a predetermined level based on a contact database 98. The contact database 98 contains information regarding concerned parties and includes data fields such as primary vehicle engineer, division, and email address. The emergency alert module 72 thus allows a vehicle engineer to be notified before servicing takes place so that the engineer may potentially inspect the vehicle in an unaltered state.

FIGS. 7–16 illustrate customer user interfaces in accordance with the present invention. The dialog manager 20 allows the customer to select to service any of their household vehicles by looking to the vehicle owner database 93. Generally in these Figures, the dialog manager 20 conducts a question and answer session with an user to narrow the problem. The user may abort question and answer at any time, but the more questions answered, the more accurate the pre-diagnosis.

Figure 7:
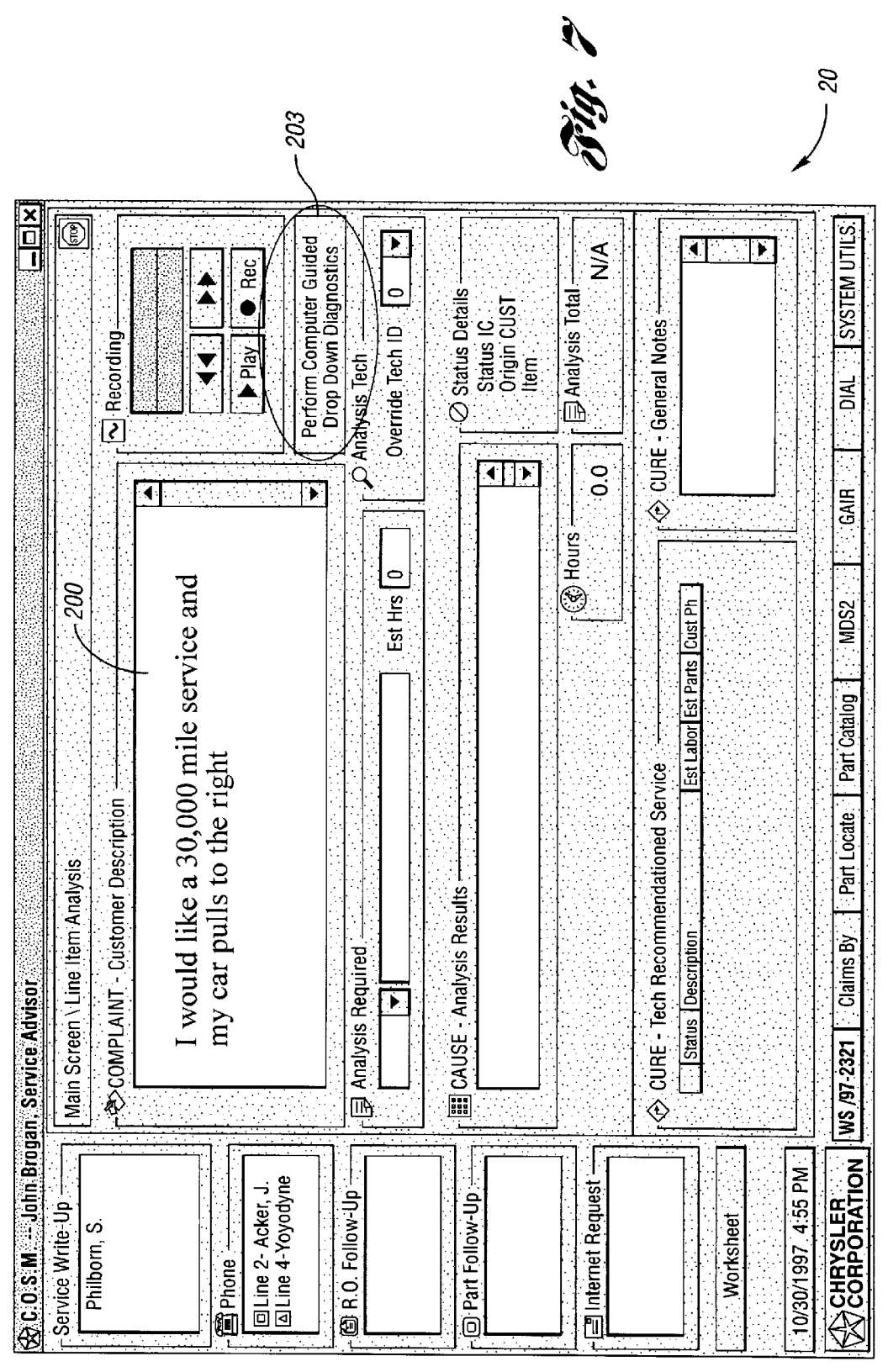

With reference to FIG. 7, dialog manager 20 prompts the customer for information regarding possible problems that the customer may be experiencing with a vehicle. The customer enters free text into dialog box 200 that a 30,000 mile service is needed and that his car pulls to the right. If the customer activates the "Perform computer-guided drill-down diagnostic" button 203, then dialog manager produces the interface 204 on FIG. 8.

Figure 8:

With reference to FIG. 8, interface 204 allows the user to enter additional information as to what might be the symptoms associated with the problem that his car pulls to the right or with what may be specifically needed for the 30,000 service. For example, interface 204 provides check boxes for the user to indicate whether the car is experiencing poor gas mileage. Also, interface 204 provides additional dialog boxes to indicate when does the problem occur (e.g., hot days) and when did the problem start as well as how often the problem occurs. Using this information, the case based reasoning tool of the present invention generates possible car analysis options.

Figure 9:
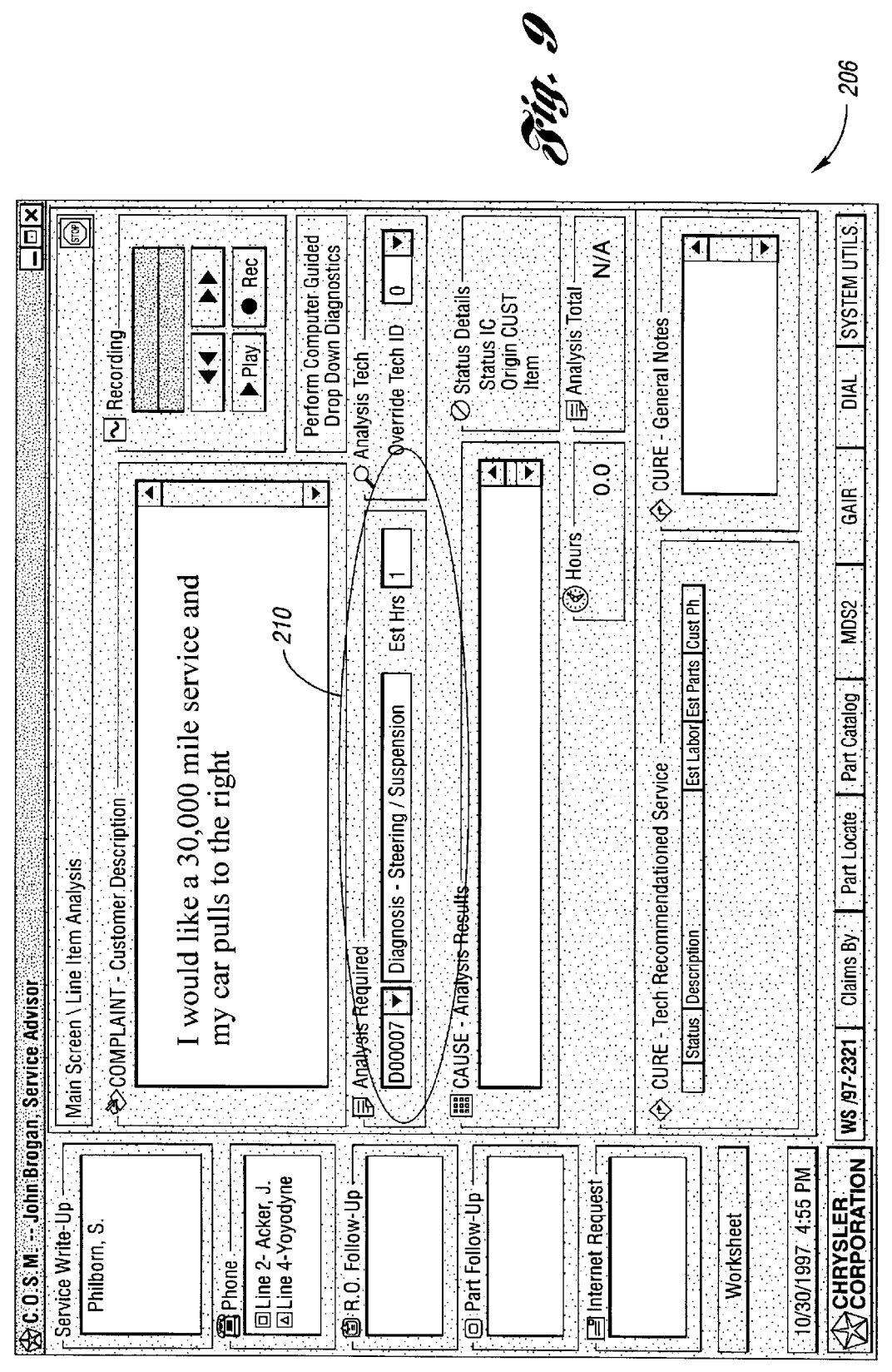

For example, in FIG. 9, interface 206 recommends at box 210 that "Diagnose—Steering/Suspension" be performed and that it will consume an estimated one hour of time to perform the analysis.

With reference to FIG. 10, interface 214 provides to the customer a textual explanation of the possible analysis that the repair shop may perform based upon the customer's description. With reference to FIG. 11, interface 216 informs the customer as to whether the repair is covered under the customer's warranty. With reference to FIG. 12, interface 217 allows the customer to select a particular dealership to have the car serviced. The options to select are preferably automatically provided to the customer based upon such factors as, but not limited to, geographic distance from the location of the user and whether any dealerships had previously serviced this particular customer or car.

Figure 14:
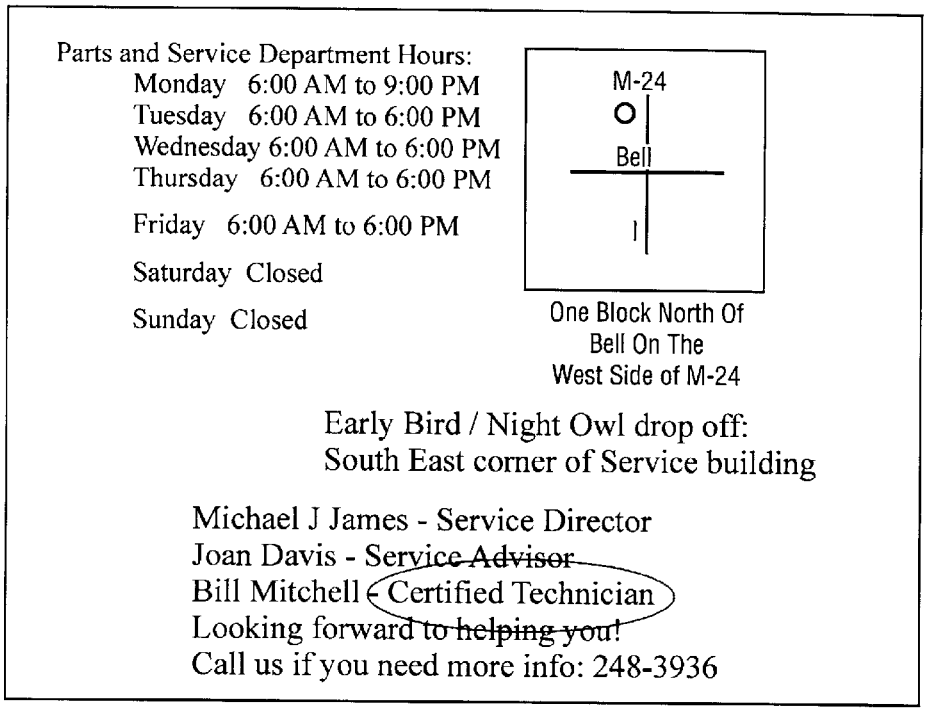
FIG. 14 is a repair processing module screen prompt for indicating the service location to the customer.

With reference to FIG. 13, interface 218 allows the customer to select the date and time for servicing the car. With reference to FIG. 14, interface 220 provides directions and a map for the customer after the customer has selected a particular dealership to service the vehicle. Moreover, interface 220 indicates whether an early bird/night owl drop off option is available to the customer at that dealership.

Figure 15:
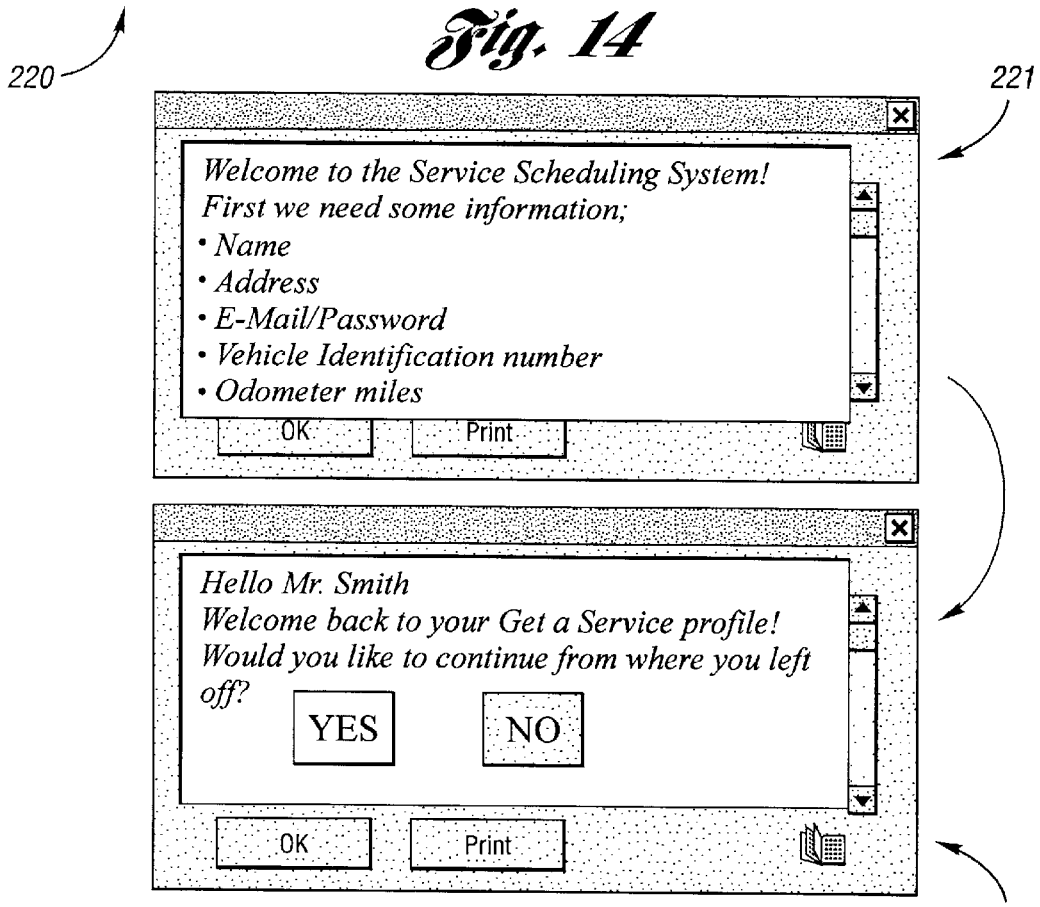
FIG. 15 is a repair processing module screen prompt for scheduling the service.
Figure 16:
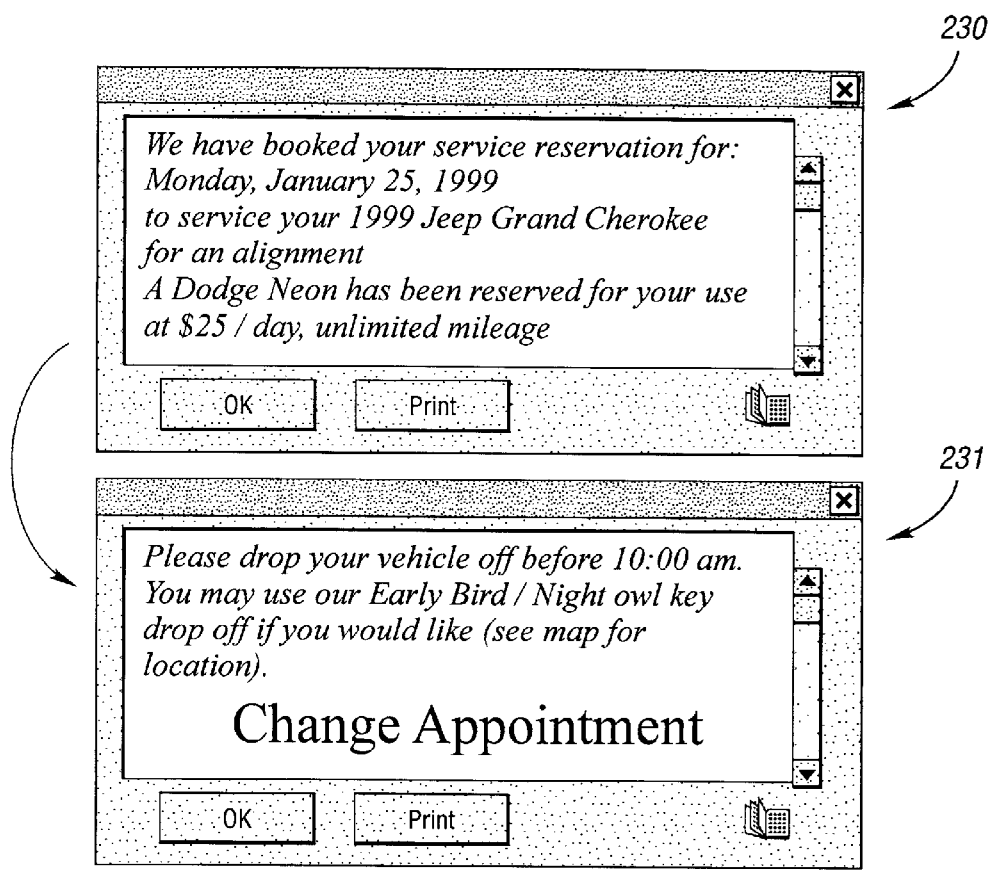
FIG. 16 is a repair processing module screen prompt for determining automobile loan availability.

With reference to FIG. 15, after the customer has entered identification information in interface 221, interface 223 allows a customer to resume a servicing request after a session may have been prematurely terminated. FIG. 16 depicts interface 230 that provides summary information to the customer as to when the servicing appointment is. Interface 231 provides information related to when the car may be dropped off at the servicing location and options as to the early bird/night owl key drop off.

FIGS. 17–28 depict exemplary user interfaces associated with a service associate utilizing the present invention in order to process a vehicle that has come into a shop for servicing. With respect to FIG. 17, a service associate can specify a particular vehicle via keypunching the VIN number or via VIN wireless bar code scanner that prepopulate these data fields as shown by reference numeral 300. Other information regarding the vehicle, such as, but not limited to the odometer reading of the vehicle can also be displayed. The service associate can analyze possible problems of the vehicle via the case based reasoning module by depressing the analyze button that is shown by reference numeral 304.

Additional information about the vehicle, such as what issues might be particular to this vehicle brand is available to the service associate via button 308. Warranty coverage associated with this particular vehicle owned in this example by the customer John T. Smith is accessible via the coverage button 312. The service history associated with the vehicle independent of who had owned the vehicle (i.e., based upon VIN number) is reviewable by activating button 316. Any type of quality control issues associated with the vehicle is accessible by activating button 320.

A work order can be assembled for the vehicle based upon why the customer brought the vehicle in for servicing. A work order is entered into the interface, and the standard number of hours and costs associated with performing the work is retrievable from the databases of the present invention so that a standard cost in hours to service the vehicle can be used by service shops throughout the entire country. The work order data is generally shown by reference numeral 324. Additional information regarding the task can be provided by region 328. If the vehicle has experienced any type of damage, then the service associate can activate the damage button 332 which then generates the user interface that is shown in FIG. 18.

With respect to FIG. 18, a service associate can indicate with a user interface manipulation device, such as via a computer mouse, where damage is located on the vehicle. For this non-limiting example, the service associate has indicated the damage location on the vehicle via an "X" shaped symbol as indicated by reference numeral 350. Moreover, the service associate can with particularity indicate what type of damage the vehicle has suffered. Some examples of damage types include a dent, scratch, hole, or other as indicated by reference numeral 354. The associate can also receive estimates for repairing the damage or other service work identified here.

Figure 20:
FIG. 20 is a computer-human interface for obtaining and modifying work order data.

If the service associate on FIG. 17 had depressed the vehicle information button 308, then a user interface as shown for example in FIG. 19 appears so that the service associate can view additional information regarding the vehicle. FIG. 20 depicts a dialog box 360 wherein the service associate can edit the customer information.

If the service associate had depressed the coverage button 312 on the interface of FIG. 17, then a user interface shown for example in FIG. 21 appears. On FIG. 21, the warranty coverage for the customer's particular vehicle is shown. This feature has an unique advantage of providing information to the service associate of warranty coverage that the customer may not have been aware of as well as when then warranty coverage expires.

If the service associate had activated the service history button 316 on the user interface of FIG. 17, then a user interface as shown for example in FIG. 22 would appear wherein the service history for the vehicle irrespective of who owned the vehicle would appear.

FIG. 23 depicts an user interface for assisting a service associate in determining costs in the hours associated with a particular item in a work order. For example, as shown in FIG. 23, the customer stated that a vehicle shakes at high speed. Based upon this work needed, a work order item "002" is retrieved from the databases of the present invention with the standardized hours to address this particular customer need.

If the service associate had depressed the analyzed button 304 on FIG. 17, then the user interface of FIG. 24 would appear. With respect to FIG. 24, the customer's statement of the problem is analyzed via questions shown by reference numeral 400. Based upon these questions in the case based reasoning tool of the present invention, hints as shown by reference 404 are provided as well as an estimated labor hours and estimated monetary amount to address the problem.

Figure 25:
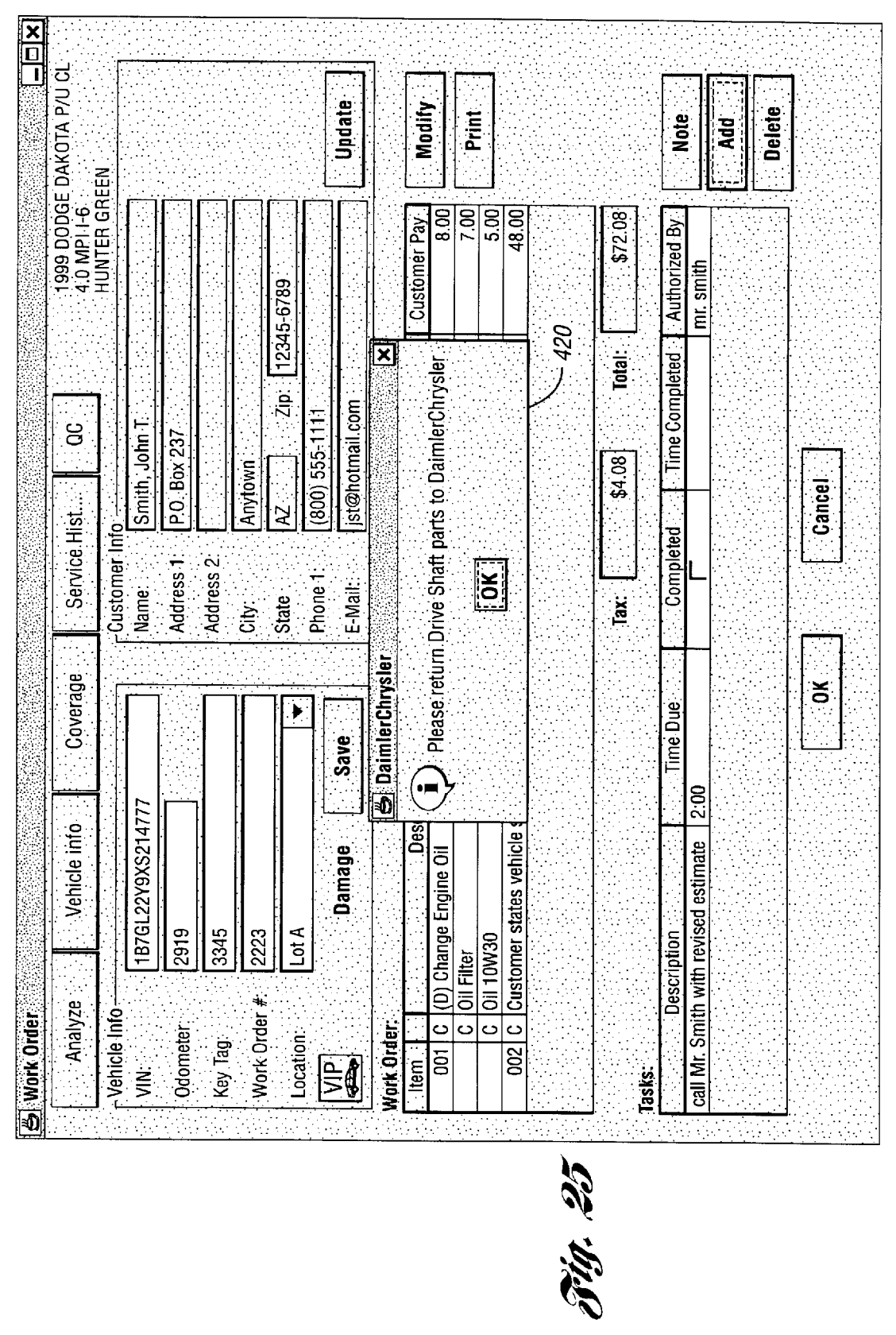

FIG. 25 depicts dialog box 420 wherein special messages related to a particular work order item or a particular vehicle can be provided to the service associate in order to help the service associate properly perform their function. For example, dialog box 420 indicates that drive shaft parts are to be returned to the vehicle's manufacturer after servicing of the vehicle has been performed.

FIG. 26 depicts an user interface which provides an electronic labor operation look up feature. In this example, the user interface allows navigation to determine the applicable LOP that describes the service needed/done. Several ways of searching for the appropriate LOP include, but are not limited to, by labor or part description by part number, or combinations of these. Boolean search logic can be used to assist in the searching. Vehicle specific issues are shown, such as, whether additional labor is required if the vehicle was built with air conditioning.

Figure 27:
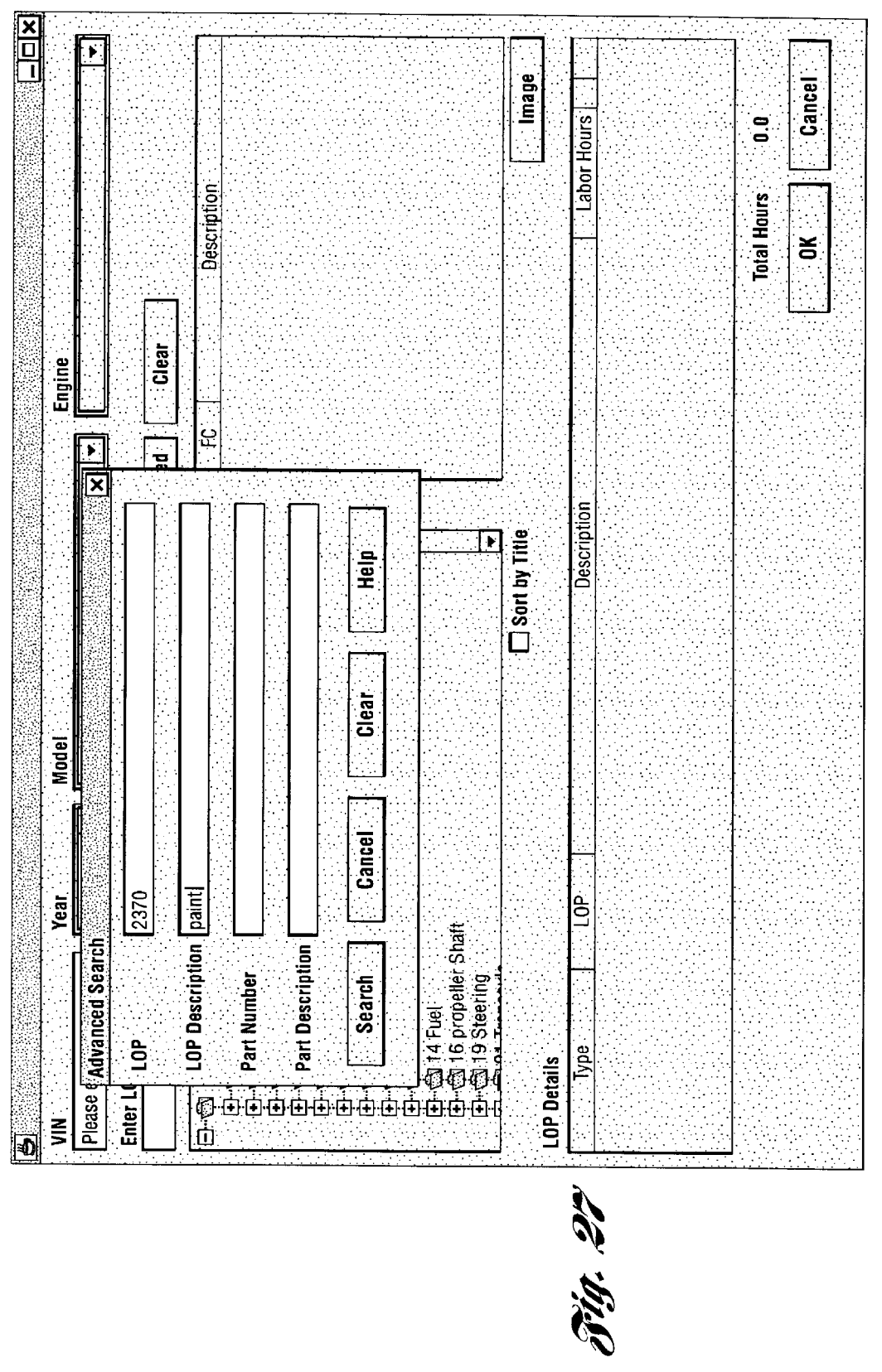

FIG. 27 depicts an user interface to help the service associate perform a search in order to search the present invention's database for paint-related problems.

FIG. 28 depicts an user interface whereby multi-media failure code descriptions are provided to the service associate in order to determine what type of problem exists relative to the vehicle. The multi-media failure code descriptions include graphical pictures as shown by dialog box 470, as well as sound descriptions, or movies. For example, the customer can listen to different engine rattling sounds generated from the present invention so that the customer can identify which generated engine rattling sound most approximates the rattling problem which the customer's vehicle is experiencing.

It is to be understood that the invention is not limited to the exact construction illustrated and described above, but that various changes and modifications may be made without departing from the spirit and scope of the invention as defined in the following claims. For example, the present invention also includes sending an electronic message to the customer to remind them of an upcoming servicing appointment that the customer has made or provide a servicing reminder at a particular time interval (e.g., when the car has approximately reached 30,000 miles and it is time for a 30,000 mile servicing checkup).

What is claimed is:

1. A computer-based vehicle repair administration system comprising:
a dialog manager for collecting service information regarding a vehicle from a user of the vehicle;
an artificial intelligence-based reasoning module for analyzing said service information to determine a diagnosis; and
a repair processing module for administering service of the vehicle based on said diagnosis and said service information wherein administering service of the vehicle includes presenting the user with at least one suggested service location, accepting the user's selection of a service location, and scheduling service at the selected service location.

2. The system according to claim 1 further comprising:
a warranty analysis module for determining a warranty status based on a vehicle owner database, said vehicle owner database containing information regarding vehicle warranties;
a service dealer selector module for determining a service dealer location based on said warranty status, said service information and a service dealer database, said service dealer database containing information regarding service dealers;
a scheduler module for scheduling said vehicle for service at a specific time based on said service dealer location and said service dealer database;
a technician selector module for selecting a technician at said service dealer location to service said vehicle based on said specific time and said service dealer database; and
a vehicle loan module for determining vehicle loan availability at said specific time;
the repair processing module administering service of the vehicle utilizing at least one of the warranty analysis module, service dealer selector module, scheduler module, technician selector module and vehicle loan module.

3. The system of claim 1 wherein said diagnosis comprises a pre-diagnosis.

4. The system according to claim 1 wherein the dialog manager collects service information regarding the vehicle from the user of the vehicle including through a question and answer session with the user.

5. A computer-based warranty administration system comprising:
a dialog manager for collecting service information regarding a vehicle from a user;
an artificial intelligence-based reasoning module for analyzing said service information to determine a diagnosis;
a repair processing module for administering warranty-specific service based on said diagnosis and said service information;
an equipment configuration module for determining whether said vehicle contains an equipment configuration which has been identified as having servicing issues based on a known issues database, said known issues database containing information regarding servicing issues;
a recall module for determining whether said vehicle is under recall based on said known issues database;
a VIN module for determining whether a VIN for said vehicle has been identified as having servicing issues based on said known issues database; and
an emerging issues module for updating an emerging issues database based on said diagnosis, said emerging issues database containing information regarding servicing issues not found in said known issues database.

6. The system according to claim 5 further comprising a vehicle quality feedback module for monitoring servicing issues based on said diagnosis and said service information.

7. A computer-based vehicle repair administration method comprising:
collecting service information regarding a vehicle from a user of the
vehicle;
determining a diagnosis based upon artificial intelligence analysis of the service information; and
administering service of the vehicle based on the collected service information and determined diagnosis wherein administering service of the vehicle includes presenting the user with at least one suggest service location, accepting the user's selection of a service location, and scheduling service at the selected service location.

8. The method of claim 7 further comprising:
determining warranty coverage based upon the determined diagnosis and upon the service information from the user; and
providing the determined warranty coverage to the user.

9. The method of claim 7 further comprising:
receiving the service information via an Internet-based network; and
providing information regarding service of the vehicle determined by administering service of the vehicle to the user via the Internet-based network.

10. The method of claim 7 wherein the service information from the user is directed to repairing the vehicle.

11. The method of claim 7 wherein the artificial intelligence analysis is based upon case base reasoning analysis of the service information.

12. The method of claim 7 wherein the artificial intelligence analysis is based upon a neural network analysis of the service information.

13. The method of claim 7 further comprising:
providing multi-media information to the user in order to determine the diagnosis for the vehicle.

14. The method of claim 13 wherein the multi-media information includes audio and video information related to a problem of the vehicle.

15. The method of claim 7 wherein said diagnosis is a pre-diagnosis.

16. The method of claim 7 wherein the dialog manager collects service information regarding the vehicle from the user of the vehicle including through a question and answer session with the user.

17. A computer-based warranty administration method comprising:
collecting service information regarding a vehicle from a user;
determining a diagnosis based upon artificial intelligence analysis of the service information;
providing the determined diagnosis to the user;
receiving evaluation ratings over a predetermined period of time for vehicle repair steps,
said evaluation ratings being indicative of quality of performance for the vehicle repair steps and being associated with at least one person;
determining a statistic for at least one of the vehicle repair steps based upon the evaluation rating collected over the period of time; and determining a service person based upon the statistic for servicing the vehicle of the user based upon the determined diagnosis.

18. The method of claim 17 wherein the statistic is an average of the evaluation ratings.

19. The method of claim 17 further comprising the step of:

providing a person for additional training if the person receives a predetermined low evaluation rating over the period of time.

20. A computer-based warranty administration system comprising:

a dialog manager for collecting service information regarding a vehicle from a user;

an artificial intelligence-based reasoning module for analyzing said service information to determine a diagnosis;

a repair processing module for administering warranty-specific service based on said diagnosis and said service information;

a case based reasoning module connected to the artificial intelligence-based reasoning module for analyzing the service information to determine the diagnosis;

a diagnostic module for analyzing said service information with a symptoms database and a cases database, said symptoms database containing information regarding automotive symptoms and said cases database containing information regarding automobiles exhibiting automotive symptoms contained in said symptoms databases; and a dialog module for generating case-specific queries based on a query database, said symptoms database and said cases database, said query database containing information regarding user skill levels.

21. A computer-based warranty administration system comprising:

a dialog manager for collecting service information regarding a vehicle from a user;

an artificial intelligence-based reasoning module for analyzing said service information to determine a diagnosis;

a repair processing module for administering warranty-specific service based on said diagnosis and said service information;

a user skill determinator module for determining a skill level for said user;

a service associate module for biasing said system toward service associates based on a vehicle owner database and a query database, said vehicle owner database containing information regarding vehicle warranties and said query database containing information regarding user skill levels; and a customer module for biasing said system toward customers based on said vehicle owner database and said query database.

22. A computer-based warranty administration system comprising:

a dialog manager for collecting service information regarding a vehicle from a user;

an artificial intelligence-based reasoning module for analyzing said service information to determine a diagnosis;

a repair processing module for administering warranty-specific service based on said diagnosis and said service information;

a problem severity level analysis module for notifying concerned parties when servicing issues reach a predetermined priority level;

a severity assignment module for assigning priority levels to issues contained in a known issues database and an emerging issues database based on a severity level database, said known issues database containing information regarding servicing issues and said emerging issues database containing information regarding servicing issues not found in said known issues database, said severity level database containing information regarding problem severity; and an emergency alert module for notifying concerned parties when servicing issues have a priority above a predetermined level based on a contact database, said contact database containing information regarding concerned parties.

* * * * *

UNITED STATES PATENT AND TRADEMARK OFFICE
CERTIFICATE OF CORRECTION

PATENT NO. : 6,609,050 B2
DATED : August 19, 2003
INVENTOR(S) : David D Li and Thomas E. Haynes It is certified that error appears in the above-identified patent and that said Letters Patent is hereby corrected as shown below:

<u>Title page,</u>
Item [75], Inventor, delete "David D Li, Metamora, MI (US)" add
-- Thomas E. Haynes, Rochester Hill, MI (US) --

Signed and Sealed this

Twenty-fifth Day of November, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,609,050 B2                                                      Page 1 of 1
DATED          : August 19, 2003
INVENTOR(S)    : David D Li and Thomas E. Haynes It is certified that error appears in the above-identified patent and that said Letters Patent is hereby corrected as shown below:

Title page,
Item [75], Inventors, after "David D Li, Metamora, MI (US)" add -- Thomas E. Haynes, Rochester Hill, MI (US) --

This certificate supersedes Certificate of Correction issued November 25, 2003

Signed and Sealed this

Fourteenth Day of June, 2005

JON W. DUDAS
*Director of the United States Patent and Trademark Office*